J. F. FULLUM.
STEERING WHEEL LOCKING MECHANISM.
APPLICATION FILED OCT. 2, 1916.

1,235,676.

Patented Aug. 7, 1917.

Inventor:
James F. Fullum
by his attorney

UNITED STATES PATENT OFFICE.

JAMES F. FULLUM, OF EVERETT, MASSACHUSETTS.

STEERING-WHEEL-LOCKING MECHANISM.

1,235,676.   Specification of Letters Patent.   Patented Aug. 7, 1917.

Application filed October 2, 1916. Serial No. 123,256.

*To all whom it may concern:*

Be it known that I, JAMES F. FULLUM, a citizen of the United States, residing at Everett, in the county of Middlesex and State of Massachusetts, have invented new and useful Improvements in Steering-Wheel-Locking Mechanism, of which the following is a specification.

This invention relates to a locking mechanism for rotary shafts and is particularly adapted for use as a locking mechanism for the rotary steering wheel of ships, vessels and the like.

The object of the invention is to provide a locking mechanism which will prevent the steering shaft from being accidentally displaced or rotated, but which will allow said shaft to be easily rotated by means of the steering wheel when so desired. The locking mechanism in other words prevents the steering shaft from being rotated except when it is rotated by means of the steering wheel.

The object of the invention is further to provide a locking mechanism which, while it locks the steering shaft against accidental displacement or rotation, yet when the steering wheel is rotated for the purpose of rotating the steering shaft, said locking mechanism will be automatically operated to release or unlock the steering shaft and allow it to be rotated.

To these ends my invention consists in a locking mechanism such as hereinafter set forth in the specification and particularly in the combination and arrangement of parts set forth in the claims.

Referring to the drawings.

Like numerals refer to like parts throughout the several views of the drawings.

Figure 1:
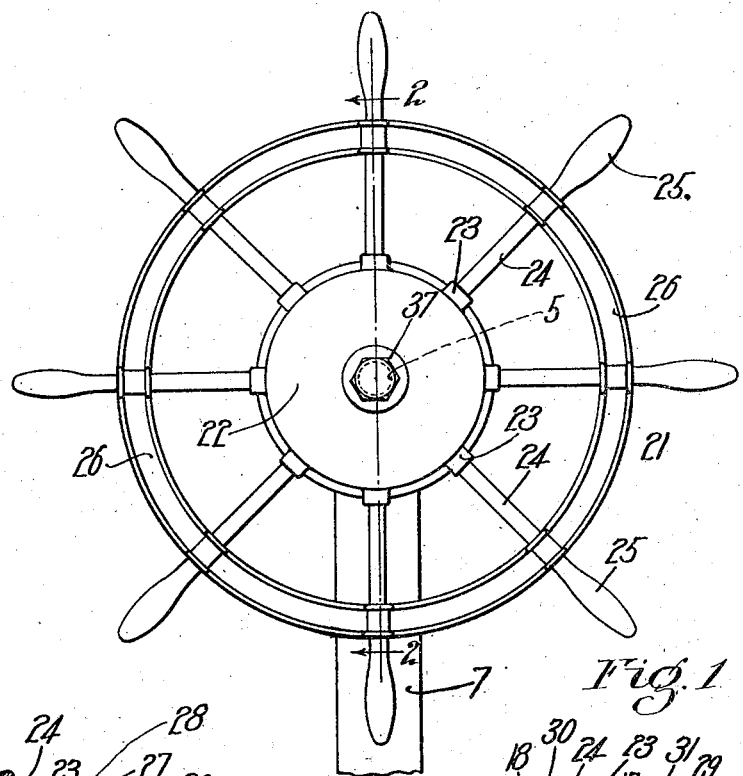
Figure 1 is a front elevation of my improved steering wheel and locking mechanism.

In the drawings, 5 is a steering shaft journaled to rotate in a bearing 6 which is clamped to a standard 7 by a cap 8 and has a disk 9 integral therewith and provided upon its periphery with teeth 10. The disk 9 is, therefore, a stationary member and constitutes one member of the locking mechanism.

Two pairs of reversely arranged pawls 11 and 12 are mounted on pivots 13 and 14, respectively, said pivots being fast to a disk-shaped pawl holder 15 which is fastened to the shaft 5 by a key 16.

Two pairs of levers 17 and 18 are pivoted at 19 and 20 to the pawl carrier 15. A steering wheel 21 is loosely mounted upon the shaft 5. Said steering wheel consists of a cap 22 which has a series of bosses 23 thereon to receive the spokes 24 of the wheel. Said spokes are provided with the usual handles 25 and are connected together by a ring 26. Said steering wheel is prevented from moving longitudinally upon the shaft 5 by a shoulder 36 on said shaft at one side of the cap 22 and on the other side by a nut 37.

A cover 27 is attached to the cap 22 and rotates therewith. Said cap is provided with an annular rib 28 which fits into a corresponding annular groove 29 provided in the cover 27. Said cover 27 is provided with two lateral projections 30 which project through notches 31 in the pawl carrier 15 and these projections serve a double purpose. One purpose is to engage the levers 17 or 18 and trip the pawls 11 or 12 to unlock the pawl carrier 15 and the shaft 5 from the locking disk 9. The other purpose is to rotate said pawl carrier and its shaft after they have thus become unlocked, which is accomplished by said projections engaging the end walls of said notches.

The pawls 11 and 12 are held normally in engagement with the teeth 10 by springs 32 which are fastened to the pawl carrier 15 by clips 33.

Figures 2, 3:
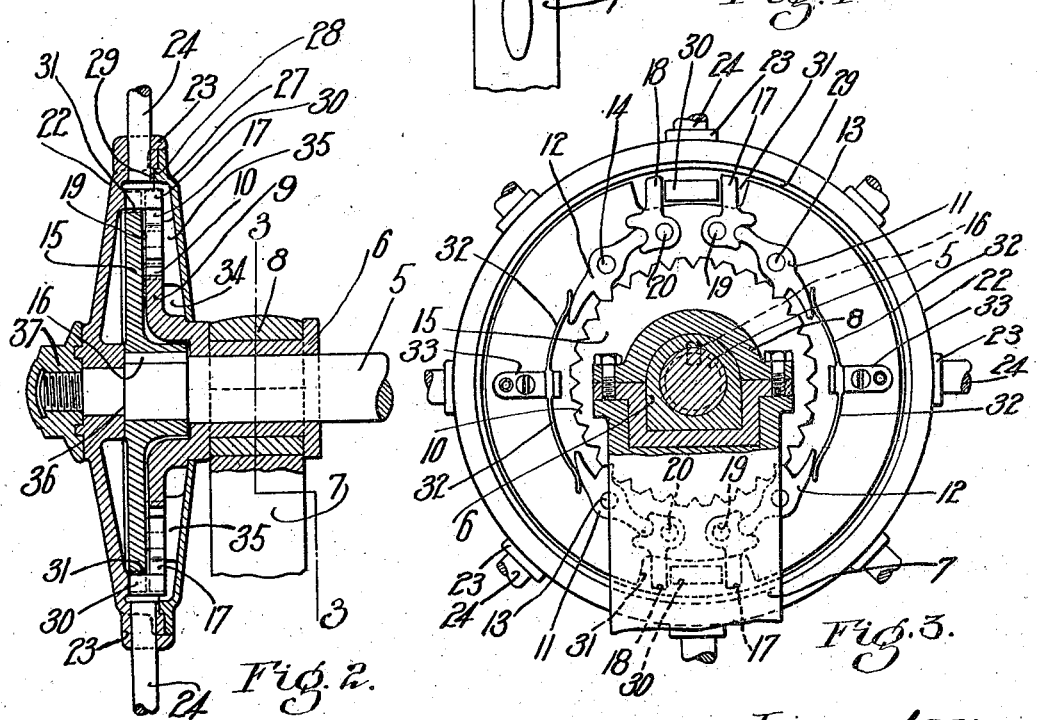
Fig. 2 is a sectional elevation taken on line 2—2 of Fig. 1.
Fig. 3 is a sectional elevation taken on line 3—3 of Fig. 2 with the steering wheel cap removed.

It will be seen by reference to Fig. 2 that the toothed disk 9, the pawl carrier 15, the pawls 11 and 12 and the levers 17 and 18 are all inclosed within a chamber 34 which is formed between the cap 22 and the cover 27. The inside of the cover 27 is provided with lugs 35 which hold the pawls 11 and 12 and the levers 17 and 18 against lateral displacement on their respective pivots.

The general operation of the mechanism hereinbefore specifically described in as follows: The steering wheel is rotated by means of the handles 25 in the usual manner. Said steering wheel, it will be observed, constitutes a driving member and is capable of movement relatively to the pawl carrier 15—that is, the projections 30 can be moved in opposite directions within the notches 31, moving said pawl carrier 15. The pawl carrier 15 and the shaft to which it is attached form, as a whole a rotary member and the pawls 11 and 12 act as stops to prevent said rotary member from rotating and becoming accidentally changed in position, but when the steering wheel is rotated in one direction the projections thereon will rock the levers 17 upon their pivots, thus throwing the pawls 11 out of engagement with the teeth 10 and the pawl carrier 15 with the shaft 5 to which it is attached will then be free to be rotated, which it will be as soon as the steering wheel has been moved far enough in the same direction to cause the projections 30 thereon to engage the end walls of the notches 31 which are adjacent to the levers 17, and upon further movement the rotary member, consisting of the pawl carrier 15 and the shaft 5 to which it is attached, will be rotated by the steering wheel. When the steering wheel is moved in the opposite direction or counterclockwise (Fig. 3), the projections 30 will first engage the levers 18 and throw the pawls 12 out of engagement with the toothed disk 9, and upon further movement the pawl carrier and shaft will be rotated in the same direction as the steering wheel. When the pawls 11 are thrown out of engagement with the toothed disk 9 and the steering wheel is moved clockwise (Fig. 3) the pawls 12 will be slipped over the teeth of the disk and vice versa.

Thus it will be seen that the shaft will at all times be locked against accidental displacement or rotary movement and can only be moved by means of the steering wheel which, when it is rotated in one direction, will unlock the shaft so that it can be rotated in that direction and when it is rotated in the opposite direction it will unlock the shaft so that it can be rotated in the latter direction.

Having thus described my invention, what I claim and desire by Letters Patent to secure is:

1. A locking mechanism having, in combination, a rotary member, a cylindrical stationary member, a series of teeth arranged circumferentially on the outer periphery of said stationary member, a pair of reversely arranged pawls mounted on said rotary member, one of said pawls adapted to engage said teeth to stop the rotation of said rotary member in one direction and the other of said pawls adapted to engage said teeth and stop the rotation of said rotary member in the opposite direction, a driving member rotatably mounted on said rotary member and capable of limited movement relatively thereto and means separate from and operated by said driving member during said limited movement to operate said pawls to unlock said rotary member.

2. A locking mechanism having, in combination, a rotary shaft, a stationary disk, teeth upon the outer periphery of said disk, a pawl carrier fast to said shaft, a wheel loosely mounted on said shaft, a projection on said wheel projecting into a notch in said pawl carrier, a pair of reversely arranged pawls mounted on said pawl carrier, one of said pawls adapted to engage said teeth to stop the rotation of said pawl carrier and the shaft to which it is attached in one direction and the other of said pawls adapted to engage said teeth and stop the rotation of said pawl carrier and the shaft to which it is attached in the opposite direction and means separate from and operated by said wheel during the movement of said projection in said notch to operate said pawls to unlock said pawl carrier and the shaft to which it is attached.

3. A locking mechanism having, in combination, a rotary shaft, a bearing for said shaft, a disk on said bearing provided with teeth in its outer periphery, a pawl carrier fast to said shaft, a pair of reversely arranged pawls mounted on said pawl carrier and adapted to engage said teeth, one of said pawls adapted to engage said teeth to stop the rotation of said pawl carrier and the shaft to which it is attached in one direction and the other of said pawls adapted to engage said teeth and stop the rotation of said pawl carrier and the shaft to which it is attached in the opposite direction, a wheel loosely mounted on said shaft, a projection on said wheel extending into a notch provided in said pawl carrier and means separate from said pawls and adapted to be operated by said projection during its limited movement in said notch to operate said pawls to unlock said pawl carrier and the shaft to which it is attached from said toothed disk.

4. A locking mechanism having, in combination, a rotary shaft, a stationary disk provided with teeth on its periphery, a pawl carrier fast to said shaft, pawls mounted upon said pawl carrier and adapted to engage the teeth of said disk, one of said pawls adapted to engage said teeth to stop the motion of said pawl carrier in one direction and the other of said pawls adapted to engage said teeth and stop the motion of said pawl carrier in the opposite direction, a pair of levers pivoted to said pawl carrier, a wheel loosely mounted on said shaft, and a projection on said wheel extending through a notch provided in said pawl carrier and into alinement with said levers, whereby upon a limited movement imparted to said wheel said levers will be operated to operate said pawls to unlock said pawl carrier and the shaft to which it is attached from said toothed disk.

5. A locking mechanism having, in combination, a rotary member, a cylindrical stationary member, a series of teeth arranged circumferentially and on the outer periphery of said stationary member, a plurality of pairs of reversely arranged pawls mounted on said rotary member, one of the pawls of each of said pairs adapted to engage said teeth to stop the rotation of said rotary member in one direction and the other pawls of each of said pairs of pawls adapted to engage said teeth and stop the rotation of said rotary member in the opposite direction, a driving member rotatably mounted on said rotary member and capable of limited movement relatively thereto and means separate from said pawls and operated by said driving member during said limited movement to operate said pawls to unlock said rotary member.

6. A locking mechanism having, in combination, a rotary shaft, a bearing for said shaft, a disk integral with said bearing, a series of teeth on the outer periphery of said disk, a pawl carrier fastened to said shaft, a pair of reversely disposed pawls pivoted to said pawl carrier and engaging the teeth on said disk, one of said pawls adapted to engage said teeth and stop the rotation of said pawl carrier and the shaft to which it is attached in one direction and the other of said pawls adapted to engage said teeth and stop the rotation of said pawl carrier and the shaft to which it is attached in the opposite direction, a wheel loosely mounted on said shaft, a projection on said wheel extending into a notch provided in said pawl carrier and means separate from said pawls and operated by the movement of said projection in said notch to move said pawls to unlock said pawl carrier and the shaft to which it is attached from said toothed disk, said wheel having a chamber in the central portion thereof in which said pawl carrier, pawls and toothed disk are inclosed.

In testimony whereof I have hereunto set my hand in presence of two subscribing witnesses.

JAMES F. FULLUM.

Witnesses:
CHARLES S. GOODING,
SYDNEY F. TAFT.

Copies of this patent may be obtained for five cents each, by addressing the "Commissioner of Patents, Washington, D. C."